US011456147B2

(12) United States Patent
Tickner (10) Patent No.: US 11,456,147 B2
(45) Date of Patent: Sep. 27, 2022

(54) SHIELDED X-RAY RADIATION APPARATUS

(71) Applicant: Chrysos Corporation Limited, Urrbrae (AU)

(72) Inventor: James Tickner, Urrbrae (AU)

(73) Assignee: Chrysos Corporation Limited, Urrbrae (AU)

( * ) Notice: Subject to any disclaimer, the term of this patent is extended or adjusted under 35 U.S.C. 154(b) by 170 days.

(21) Appl. No.: 16/625,341

(22) PCT Filed: Jun. 23, 2017

(86) PCT No.: PCT/AU2017/050643
§ 371 (c)(1),
(2) Date: Dec. 20, 2019

(87) PCT Pub. No.: WO2018/232435
PCT Pub. Date: Dec. 27, 2018

(65) Prior Publication Data
US 2021/0327673 A1 Oct. 21, 2021

(51) Int. Cl.
*H01J 35/16* (2006.01)
*G01N 23/2204* (2018.01)
(Continued)

(52) U.S. Cl.
CPC ............ *H01J 35/16* (2013.01); *G01N 23/221* (2013.01); *G01N 23/2204* (2013.01); *G21F 1/08* (2013.01);
(Continued)

(58) Field of Classification Search
None
See application file for complete search history.

(56) References Cited

U.S. PATENT DOCUMENTS 3,781,564 A 12/1973 Lundberg
4,053,771 A * 10/1977 Aude ................. G01N 23/2204
376/159
(Continued)

FOREIGN PATENT DOCUMENTS

EP 1729307 B1 12/2006
WO WO-2015089580 A1 * 6/2015 ......... G01N 23/2208

OTHER PUBLICATIONS

International Search Report and Written Opinion; dated Sep. 8, 2017 for International Application No. PCT/AU2017/050643.
(Continued)

*Primary Examiner* — Thomas R Artman
(74) *Attorney, Agent, or Firm* — Mendelsohn Dunleavy, P.C.

(57) ABSTRACT

A shielded X-ray radiation apparatus is provided comprising an X-ray source, an X-ray attenuation shield including an elongate cavity to house the X-ray source and incorporating a region to accommodate a sample, a neutron attenuation shield, and a gamma attenuation shield. The neutron attenuation shield is situated adjacent to and substantially surrounds the X-ray attenuation shield and the gamma attenuation shield is adjacent to and substantially surrounds the neutron attenuation shield. In some embodiments a removable sample insertion means is provided to insert samples into the elongate cavity and which is composed of adjacent blocks of material, each respective block having a thickness and a composition which substantially matches the thickness and a composition of one of the X-ray attenuation, neutron attenuation and gamma-ray attenuation shields.

24 Claims, 3 Drawing Sheets

(51) Int. Cl.
*G01N 23/221* (2006.01)
*G21F 1/08* (2006.01)

(52) U.S. Cl.
CPC .............. *G01N 2223/074* (2013.01); *G01N 2223/1013* (2013.01); *G01N 2223/1016* (2013.01); *G01N 2223/204* (2013.01); *G01N 2223/309* (2013.01); *G01N 2223/616* (2013.01); *H01J 2235/165* (2013.01); *H01J 2235/166* (2013.01)

(56) References Cited

U.S. PATENT DOCUMENTS

| | | | |
|---|---|---|---|
| 4,343,997 A | | 8/1982 | Heinz |
| 4,428,902 A | * | 1/1984 | Murray ................ G01N 23/221 376/156 |
| 6,002,734 A | * | 12/1999 | Steinman ................ G21K 5/10 376/157 |
| 6,630,683 B2 | | 10/2003 | Vanvor |
| 7,312,466 B2 | * | 12/2007 | Caldwell ................ G21F 1/085 250/518.1 |
| 9,528,951 B2 | * | 12/2016 | Tickner ............. G01N 23/2208 |
| 10,401,311 B2 | * | 9/2019 | Wu .................... G01N 23/2204 |
| 10,825,643 B2 | * | 11/2020 | Liu ........................ H01J 37/09 |
| 11,183,354 B2 | * | 11/2021 | Liu ......................... H05H 7/22 |
| 2002/0134951 A1 | * | 9/2002 | Vanvor ................. G21C 1/306 250/515.1 |
| 2006/0284122 A1 | * | 12/2006 | Caldwell ................. G21F 1/085 250/515.1 |
| 2010/0243874 A1 | * | 9/2010 | Kang ....................... G21B 1/19 250/251 |
| 2010/0246763 A1 | * | 9/2010 | Kang ....................... G21B 1/19 378/57 |
| 2010/0266103 A1 | | 10/2010 | Kang et al. |
| 2012/0046867 A1 | | 2/2012 | Faber et al. |
| 2016/0320321 A1 | * | 11/2016 | Tickner ............. G01N 23/2208 |
| 2017/0072223 A1 | | 3/2017 | Hsu et al. |
| 2018/0172608 A1 | * | 6/2018 | Wu ........................ G01V 5/101 |
| 2019/0198282 A1 | * | 6/2019 | Liu ......................... H05H 7/22 |
| 2019/0198285 A1 | * | 6/2019 | Liu .......................... H05G 1/02 |
| 2021/0255120 A1 | * | 8/2021 | Tickner ................ G01N 23/222 |
| 2021/0327673 A1 | * | 10/2021 | Tickner ................... H01J 35/16 |

OTHER PUBLICATIONS

"Polyolefins (Polyalkenes)," published on Jan. 3, 2017 as per Wayback Machine, retrieved from the internet on Sep. 1, 2017 by Australian International Searching Authority, <URL: https://web.archive.org/web/20170103021715/http://www.polymerdatabase.com/polymer%20classes/Polyolefin%20type.html>.

Tickner, James, et al. "Improving the sensitivity and accuracy of gamma activation analysis for the rapid determination of gold in mineral ores." Applied Radiation And Isotopes 122 (2017): 28-36.

Extended European Search Report for corresponding European application No. 17914289.8; dated Apr. 3, 2020 (9 pages).

* cited by examiner

SHIELDED X-RAY RADIATION APPARATUS

TECHNICAL FIELD

Embodiments described herein generally relate to a shielding apparatus to shield a high-energy, high-power X-ray source. Here, high-energy denotes X-rays with energies in the multi-MeV energy range. In particular, embodiments relate to an apparatus for shielding an X-ray source, where the X-ray source is intended for the use of gamma activation analysis. Particular applications relate to use of the X-ray source for the analysis of gold and other valuable elements such as silver, copper and lead in mineral ore samples. A method is further provided to optimise shielding for an X-ray radiation apparatus.

BACKGROUND

Gamma activation analysis (GAA), also known as photon activation analysis, uses a high-energy X-ray source to induce nuclear reactions in target elements in a sample, and then measures decay radiation emitted by the activated sample to determine the concentrations of these elements.

Typically, X-rays in the multi-MeV energy range are produced using sources that use an electron accelerator fitted with a conversion target to produce X-rays via the Bremsstrahlung process. A common type of electron accelerator is a linear accelerator or LINAC.

If elements present at low concentrations are to be detected with good sensitivity, then a high-intensity X-ray source is required. For example, a linear accelerator beam power of 5-10 kW or higher may be used. Beam power described herein refers to the power of the accelerated electron beam incident on the X-ray conversion target. Such high intensity sources produce prodigious quantities of X-ray radiation, often in the range of 100-200 Sieverts(Sv)/min, measured at one metre from the X-ray emission point. Such radiation levels present a severe risk to personnel, and must be reduced using appropriate shielding.

X-ray sources used for GAA are generally operated at source energies of at least 7 MeV, and can be used at energies up to 15 MeV, or even higher. The source energy refers to the peak energy of the accelerated electron beam, which corresponds to the end-point energy of the X-ray Bremsstrahlung spectrum. These energies are sufficiently high enough to induce nuclear reactions in certain elements. These reactions commonly include the production of neutrons, which present an additional radiation hazard. It is necessary that shielding be designed to also reduce neutron radiation levels in accessible areas to an acceptable level.

Conventionally, accelerator-based systems for industrial application fall into three broad categories:

1. Those used for radiation therapy in hospital environments. X-ray sources associated with these systems are typically operated at source energies ranging from a few MeV to 15-18 MeV, but have a relatively low power (a dose rate of a few Sv/min) and very low duty cycle (up to 500 Sv/week). Shielding is normally provided by building a massive concrete 'bunker' with a convoluted passageway or 'maze' to provide access.
2. Accelerators used for industrial sterilisation or product irradiation and which are typically operated at source energies of up to 10 MeV. In this type of system the beam powers can be very high, of the order of 10-20 kW or more. Again, shielding is provided by massive concrete construction, with objects to be irradiated conveyed on a curved path to avoid radiation streaming. Massive shielding doors may also be deployed.
3. Accelerators used for security imaging applications such as cargo scanning. Such systems are generally operated at a low source energy of about 6 MeV or in dual-energy mode (for example, alternating between 3 and 6 MeV), although energies up to 9 MeV can be used in some applications. In these systems the beam power is also generally very low and neutron production is not a significant consideration. Shielding generally comprises lead or tungsten around the accelerator, and a steel-walled cabin.

Conventional methods of deploying the type of high-power accelerator source used for GAA require the construction of a dedicated, special-purpose concrete shield. Typically, the shielding thickness required is of order 1.5-2.0 m, which leads to a large footprint and masses of hundreds to thousands of tonnes.

Alternative existing approaches to accelerator shielding include the development of special purpose materials that provide both X-ray and neutron shielding. One example consists of a concrete mixture combined with special X-ray and neutron absorbing additives. However, such approaches increase the overall mass of shielding required.

It is desirable to provide an improved shielding apparatus for use with a high-energy, high-powered X-ray source suitable for GAA.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A shielded X-ray radiation apparatus is provided. The shielded X-ray radiation apparatus comprising:
- an X-ray source;
- an X-ray attenuation shield including an elongated cavity having a region at one end to accommodate a sample;
- a neutron attenuation shield;
- a gamma attenuation shield; and
- wherein the neutron attenuation shield is adjacent to and substantially surrounds the X-ray attenuation shield; and
- wherein the gamma attenuation shield is adjacent to and substantially surrounds the neutron attenuation shield.

The X-ray source may be any suitable device for gamma activation analysis. The X-ray source may include an electron accelerator for generating an electron beam having an electron beam direction, and an conversion target at which the electron beam is directed.

In one embodiment, the energy of the electron beam generated from the electron accelerator may be between 7 MeV and 15 MeV and the electron accelerator may be operable with a beam power of at least 0.5 kW, and preferably of about 8 kW. The maximum beam power may be a decreasing function of the beam energy.

In another embodiment the energy of the electron beam generated from the electron accelerator may be between 7 MeV and 10 MeV. In such an embodiment electron accelerator may have a maximum beam power of 2 kW.

Conceivably, the energy of the electron beam generated from the electron accelerator may be between 8 MeV and 10 MeV. In such an embodiment electron accelerator may have a maximum beam power of between 8 kW and 20 kW.

The X-ray attenuation shield is preferably constructed from a high density material and is preferably constructed principally of lead. Less preferably, the X-ray attenuation shield is constructed principally of tungsten. Alternatively the X-ray attenuation shield is constructed of layers of lead and tungsten.

The neutron attenuation shield is preferably constructed from a polymer material having a hydrogen density of approximately 0.1 g/cm$^3$. Polymers with the generic formula $(-CH_2-)_n$, such as polyethylene, are particularly suitable. Alternatively, the neutron attenuation shield may be formed from a cast resin such as polyurethane resin. The shield may include hydrogen enriching materials, such as, but not limited to one or more of polyethylene or polypropylene. The polymer material may optionally, or in addition, include a proportion of a substantially neutron-absorbing element chosen from the group including boron and lithium. The proportion of the neutron-absorbing element may be in the range 1-5 wt %, and preferably be 5 wt %.

The gamma attenuation shield is preferably constructed principally of lead. Less preferably, the gamma attenuation shield is constructed principally of steel. Alternatively the gamma attenuation shield is constructed of composite layers of lead and steel.

A portion of the cavity's inner walls may be lined with a support casing to support at least the electron accelerator, X-ray conversion target and irradiated sample in the correct relative positions. Preferably the support casing is constructed from steel. Alternative materials may be selected as long as the materials are substantially free from elements that readily activate via X-ray or neutron-induced nuclear reactions.

The thickness of the X-ray attenuation shield at an angle of 90° from the electron beam direction may be in the range of 60-80% of the thickness in the forward direction, and the thickness at an angle of 180° from the electron beam direction may be in the range of 25 to 50% of the thickness in the forward direction. More preferably, the thickness of the X-ray attenuation shield at an angle of 90° from the electron beam direction may be approximately 75% of the thickness in the forward direction, and the thickness at an angle of 180° from the electron beam direction may be approximately 50% of the thickness in the forward direction.

The thickness of the X-ray attenuation shield thickness in the forward direction may be estimated using tabulated tenth value layers and a desired dose attenuation factor. More particularly, the X-ray attenuation shield thickness ($t_{XR}$) in the forward direction may be estimated by the equation: $t_{XR}=TVL \times \log_{10}[(R \times 60 \times 10^6)/(r\ d^2)]$, where d is the distance from the target at which the reduced dose rate is to be calculated, R is the dose rate at 1 m from the target produced by the unshielded source, r is the desired shielded does rate at the closest personnel-accessible point at distance d and TVL is the predefined tenth value layer for the X-ray attenuation shield material.

The thickness of the neutron attenuation layer may be determined from knowledge of the neutron production rate of the X-ray source. The neutron production rate is a function of the design of the source, particularly the X-ray conversion target, and of the energy of the electron beam. Commonly, the neutron emission rate will be provided by the source manufacturer in terms of the dose rate (Sv) due to neutron emission divided by the dose rate (Sv) due to X-ray emission. From this parameter, the unshielded neutron dose rate at a given distance from the source may be calculated from knowledge of the forward-directed X-ray dose rate.

The required neutron attenuation factor, f can be calculated as the ratio of the unshielded dose rate to the desired shielded rate. The thickness of the neutron shield in the forward direction can be estimated using the formula $TVL*\log_{10}(f)$ where TVL is the tabulated tenth-value thickness of low-energy neutrons in the chosen neutron attenuation material. For example, the TVL in borated polyethylene for neutrons produced by X-rays with end-point energies up to 15 MeV is 62 mm. A neutron shield of thickness 200-300 mm will then reduce the neutron flux by a factor of 1700-7000.

As neutron emission is substantially isotropic, the thickness of the neutron attenuation layer may be chosen to be approximately constant with angle from the electron beam direction. If the elongation of the shield required to accommodate the X-ray source is substantial, the closest accessible point in the rear direction (close to 180°) may be significantly further from the X-ray conversion target than the closest accessible point in the forward direction. In this case, the thickness of the neutron attenuation shield in the rear direction may be proportionally reduced. Preferably, the thickness in the rear direction is 50-100% of the thickness in the forward direction.

Preferably the gamma attenuation shield has a thickness which is proportional to the optimised thickness of the neutron attenuation shield.

The shielded X-ray radiation apparatus may further comprise a removable sample insertion means for inserting samples into the elongate cavity; wherein the removable sample insertion means is composed of adjacent blocks of materials, each respective block having a thickness and a composition which substantially matches the thickness and a composition of one of the X-ray attenuation, neutron attenuation and gamma-ray attenuation shields.

The removable sample insertion means may further comprise a stage member on which a sample to be irradiated is locatable; and wherein the adjacent blocks of materials comprise a first block adjacent the stage member, a second block abutting the first block, and a third block abutting the second block; wherein:

the first block is comprised of a material to substantially attenuate X-rays and having a thickness which is the same or substantially the same as the X-ray attenuation shield, the second block is comprised of a material to substantially attenuate neutrons and having a thickness which is the same or substantially the same as the neutron attenuation shield, and the third block is comprised of a material to substantially attenuate gamma-rays with a thickness which is the same or substantially the same as the gamma attenuation shield; and wherein the shielded X-ray radiation apparatus comprises a sleeve through which the stage member is able to traverse.

Preferably the sleeve of the apparatus and the removable sample insertion means has a clearance tolerance of less than 2.00 mm, more preferably less than 1.00 mm, and more preferably less than 0.50 mm.

The stage member of the removable sample insertion means may be manufactured from steel, or any another substance that is free from elements that undergo significant activation from X-rays or neutrons.

In one embodiment, the outer profile of the removable sample insertion means is stepped, with at least one of the dimensions of one or more of the blocks increasing in a direction perpendicular to a direction of travel with increasing distance from the stage member. The width of the or each step is preferably in the range of 5 to 15 mm.

For example, the first block may comprise of at least two steps, such that the dimensions of the block increase in a stepwise fashion from the innermost to outermost steps. The width of each step may be in the range 5 to 15 mm. The first block is preferably made from a material substantially attenuating for X-rays, such as lead or tungsten.

The first block may be adhered to the stage member by any suitable means. For example, the stage may comprise an angled bracket incorporating holes through which bolts may be inserted to rigidly attached the first block portion to the stage.

The second block may be a unitary block having an inner face and an outer face. The inner face of the second block portion preferably abuts the outer face of the outermost step of the first block. The second block may be adhered to the first block by any suitable means way, for instance by way of a steel bracket bolting respective sections to one another. The second block is preferably made of the material used to construct the neutron attenuation shield, or it may be made of an alternative material substantially attenuating to neutrons, such as polyethylene containing 5 wt % boron.

The third block may be a unitary block having an inner face and an outer face. The inner face of the third block preferably abuts the outer face of the second block. The third block may be adhered to the second block by any suitable means, such as a steel bracket bolting the respective sections to one another. Alternatively, the third block may be shaped to provide direct means for bolting to the second block. The third block is preferably be made of a material substantially attenuating for gamma-rays, such as lead or tungsten.

The removable sample insertion means may further comprise an attachment portion having an inner face, wherein the dimensions of the inner face are the same as or larger than the dimensions of the outer face of the third block, and wherein the outer face of the third block abuts the inner face of the attachment portion. The attachment block portion may be adhered to the third block by any suitable means. The attachment portion may be hollow. The material from which the attachment portion is constructed need not be a radiation shielding material. The attachment means may be fixed to a linear drive mechanism to insert and remove the removable sample insertion means from the X-ray shield.

Advantageously, embodiments utilising the removable sample insertion means enable insertion and removal of samples to be analysed through the sequentially layered shield without compromising its shielding integrity.

A further shielded X-ray radiation apparatus is provided, the radiation apparatus comprising:
- an X-ray source;
- an X-ray attenuation shield including an elongate cavity to house the X-ray source and incorporating a region to accommodate a sample;
- a neutron attenuation shield adjacent to and substantially surrounding the X-ray attenuation shield;
- a gamma attenuation shield adjacent to and substantially surrounding the neutron attenuation shield; and
- a removable sample insertion means for inserting samples into the elongate cavity; wherein the removable sample insertion means is composed of adjacent blocks of material, each respective block having a thickness and a composition which substantially matches the thickness and a composition of the X-ray attenuation, neutron attenuation and gamma-ray attenuation shields respectively.

The removable sample insertion means may further comprise a stage member on which a sample to be irradiated is locatable; wherein the adjacent blocks of materials comprise a first block adjacent the stage member, a second block abutting the first block, and a third block abutting the second block; wherein:
- the first block is comprised of a material to substantially attenuate X-rays and having a thickness which is the same or substantially the same as the X-ray attenuation shield,
- the second block is comprised of a material to substantially attenuate neutrons and having a thickness which is the same or substantially the same as the neutron attenuation shield, and
- the third block is comprised of a material to substantially attenuate gamma-rays with a thickness which is the same or substantially the same as the gamma attenuation shield; and
- wherein the shielded X-ray radiation apparatus comprises a sleeve through which the stage member is able to traverse.

The sleeve of the apparatus and the removable sample insertion means may have a clearance tolerance of less than 2.00 mm, more preferably less than 1.00 mm, and more preferably less than 0.50 mm.

The outer profile of the removable sample insertion means may be stepped, with at least one of the adjacent blocks increasing in height or width, in a direction perpendicular to a direction of travel with increasing distance from the stage member. The width of the or each step may be in the range of 5 to 15 mm. In one embodiment, the first block comprises at least two steps, such that the dimensions of the first block increase in a stepwise fashion from the innermost to outermost steps.

The X-ray attenuation shield may have a thickness which decreases with increasing angle from the electron beam direction. The thickness of the X-ray attenuation shield at an angle of 90° from the electron beam direction may be in the range of 60-80% of the thickness in the forward direction, and the thickness at an angle of 180° from the electron beam direction may be in the range of 25 to 50% of the thickness in the forward direction. More preferably, the thickness of the X-ray attenuation shield at an angle of 90° from the electron beam direction may be approximately 75% of the thickness in the forward direction, and the thickness at an angle of 180° from the electron beam direction may be approximately 50% of the thickness in the forward direction.

The thickness and the materials from which the respective shields are formed may be configured in accordance with the description thus far taught.

A method is provided to optimise shielding for an X-ray radiation apparatus, in which the apparatus comprises an X-ray attenuation shield including an elongate cavity to house an X-ray source, a neutron attenuation shield adjacent to and substantially surrounding the X-ray attenuation shield, and a gamma attenuation shield adjacent to and substantially surrounding the neutron attenuation shield, the method comprising:

determining a first thickness ($t_{XR}$) of the X-ray attenuation shield in the forward direction by the equation: $t_{XR}=\text{TVL}\times\log_{10}[(R\times 60\times 10^6)/(r\ d^2)]$, where d is the distance from an electron target, R is the dose rate at 1 m from the electron target produced by an X-ray source, r is the shielded does rate at the closest personnel-accessible point and TVL is a predefined tenth value layer for the X-ray attenuation shield material;

determining a thickness of the X-ray attenuation shield at an angle of 90° from the electron beam direction to be in the range of 60-80% of the thickness in the forward direction; and determining a thickness of the X-ray attenuation shield at an angle of 180° from the electron beam direction to be in the range of 25-50% of the thickness in the forward direction.

The method to optimise shielding for an X-ray radiation apparatus may further comprise determining a thickness of the X-ray attenuation shield at an angle of 90° from the electron beam direction to be approximately 75% of the thickness in the forward direction.

The method to optimise shielding for an X-ray radiation apparatus may further comprise determining a thickness of the X-ray attenuation shield at an angle of 180° from the electron beam direction to be approximately 50% of the thickness in the forward direction.

The method to optimise shielding for an X-ray radiation apparatus may further comprise determining a thickness ($t_{nt}$) of the neutron attenuation shield in a forward direction by the equation: $t_{nt}=\text{TVL}_n \log_{10}(f)$, where $\text{TVL}_n$ is a predefined tenth-value layer for the attenuation of low energy neutrons in the neutron attenuation shield and f is a ratio of an unshielded dose rate to a desired shielded rate.

The method to optimise shielding for an X-ray radiation apparatus may further comprise determining the thickness of the neutron attenuation shield at an angle of 180° from the electron beam direction in a rearward direction to be 50% to 100% of the thickness ($t_{nt}$) in the forward direction.

The method to optimise shielding for an X-ray radiation apparatus may further comprise determining the thickness of the gamma attenuation shield to be proportional to the thickness of the neutron attenuation shield.

BRIEF DESCRIPTION OF DRAWINGS

Embodiments will now be described with reference to the accompanying drawings in which.

DESCRIPTION OF EMBODIMENTS

Figure 1:
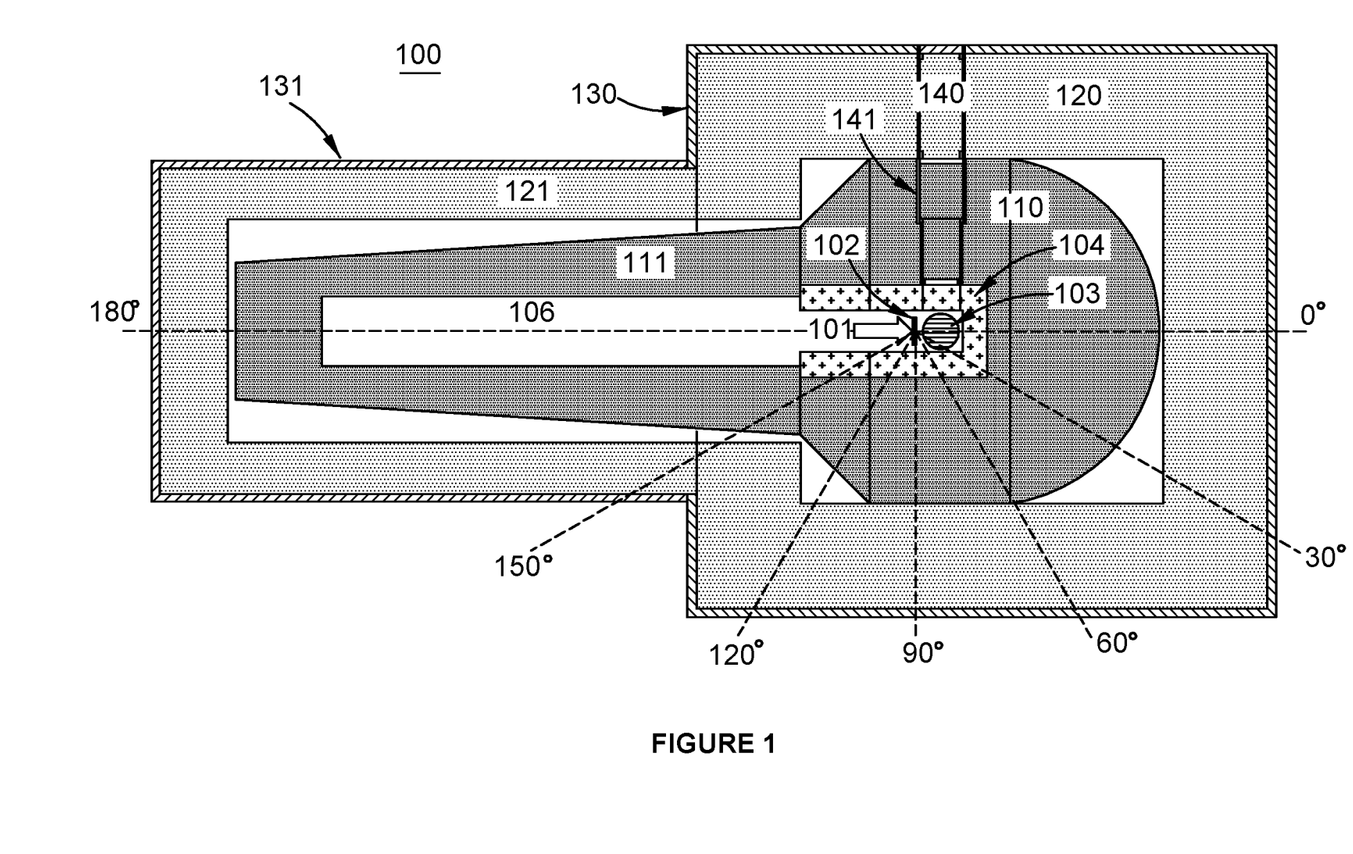
FIG. 1 is a schematic illustration of one embodiment of the shielding configuration.

FIG. 1 illustrates an example of a shielded X-ray radiation apparatus 100 which is configured to operate with an endpoint energy that can be varied over the range 8-14 MeV. The maximum X-ray dose rate delivered by the X-ray generator (not shown) varies from 160 Sv/min at an operating energy of 8 MeV to 25 Sv/min at an operating energy of 14 MeV.

The shielded X-ray radiation apparatus 100 includes an X-ray attenuation shield 110 and 111, a neutron attenuation shield 120 and 121 and a gamma attenuation shield 130 and 131. The X-ray attenuation shield includes a cavity 106 which is approximately 1.5 m in length that houses the LINAC (not shown). The LINAC accelerates a beam of electrons 101 onto a conversion target 102, producing Bremsstrahlung X-ray radiation which is substantially directed in the direction of the electron beam. In use, the X-ray radiation irradiates a sample 103.

The cavity 106 housing the forward portion of the LINAC, the conversion target 102 and the sample 103 is substantially surrounded by a support casing 104 that provides means of supporting the LINAC, target and sample in the correction relative positions. Lead, being a soft and malleable material, is poorly suited for this purpose. In this example, the support casing 104 is made from a material such as steel. In other examples the selected material should be substantially free from elements that readily activate via X-ray or neutron-induced nuclear reactions. For example, the casing should be free of the element cobalt, which leads to the formation of the long-lived $^{60}$Co isotope via the capture of neutrons. The formation of such long-lived isotopes may lead to difficulties in the eventual decommissioning or disposal of the shielding components.

The X-ray attenuation shield (a primary shield) comprises a head portion 110 and a body portion 111. The thickness of the X-ray attenuation shield is a function of the angle from the electron beam direction: directions of 0, 30, 60, 90, 120, 150 and 180 degrees are indicated on FIG. 1. The thickness is calculated in accordance with the description provided later on in the specification. The X-ray attenuation shield 110, 111 may be formed by casting molten lead into a mould or steel shell.

The X-ray attenuation shield 110, 111 is surrounded by a neutron attenuation shield (a secondary shield) 120, 121 formed of polyethylene containing 5% by weight of boron. The thickness of the neutron attenuation shield is in accordance with the description provided later on in the specification. In this example, the neutron attenuation shield 110, 111 is formed from flat sheets of material.

The neutron attenuation shield 110, 111 is surrounded by a gamma attenuation shield 130, 131 (a tertiary shield) formed from lead sheets. The gamma attenuation shield has a thickness proportional to the thickness of the underlying neutron attenuation shield. In the example shown, the ratio of thicknesses of the gamma attenuation shield to the neutron attenuation shield is 1:10.

The overall dimensions of the layered shield (110 and 111, 120 and 121, 130 and 131) are approximately 3300 mm in length and 1650 mm in width, and the total shielding mass is approximately 22 tonnes. Consequently, the shielding design can be comfortably accommodated within the size and mass constraints of a standard 20' shipping container.

The sample 103 to be irradiated is inserted and removed through the layered shielding by way of a movable sample insertion means, otherwise referred to as a plug 140. The plug 140 passes through a sleeve 141 fitted into the primary, secondary and tertiary shielding layers. The clearance between the sleeve 141 and plug 140 shall be as small as practicably possible, allowing for motion of the plug. The tolerance is preferably less than 0.5 mm.

Figure 2:
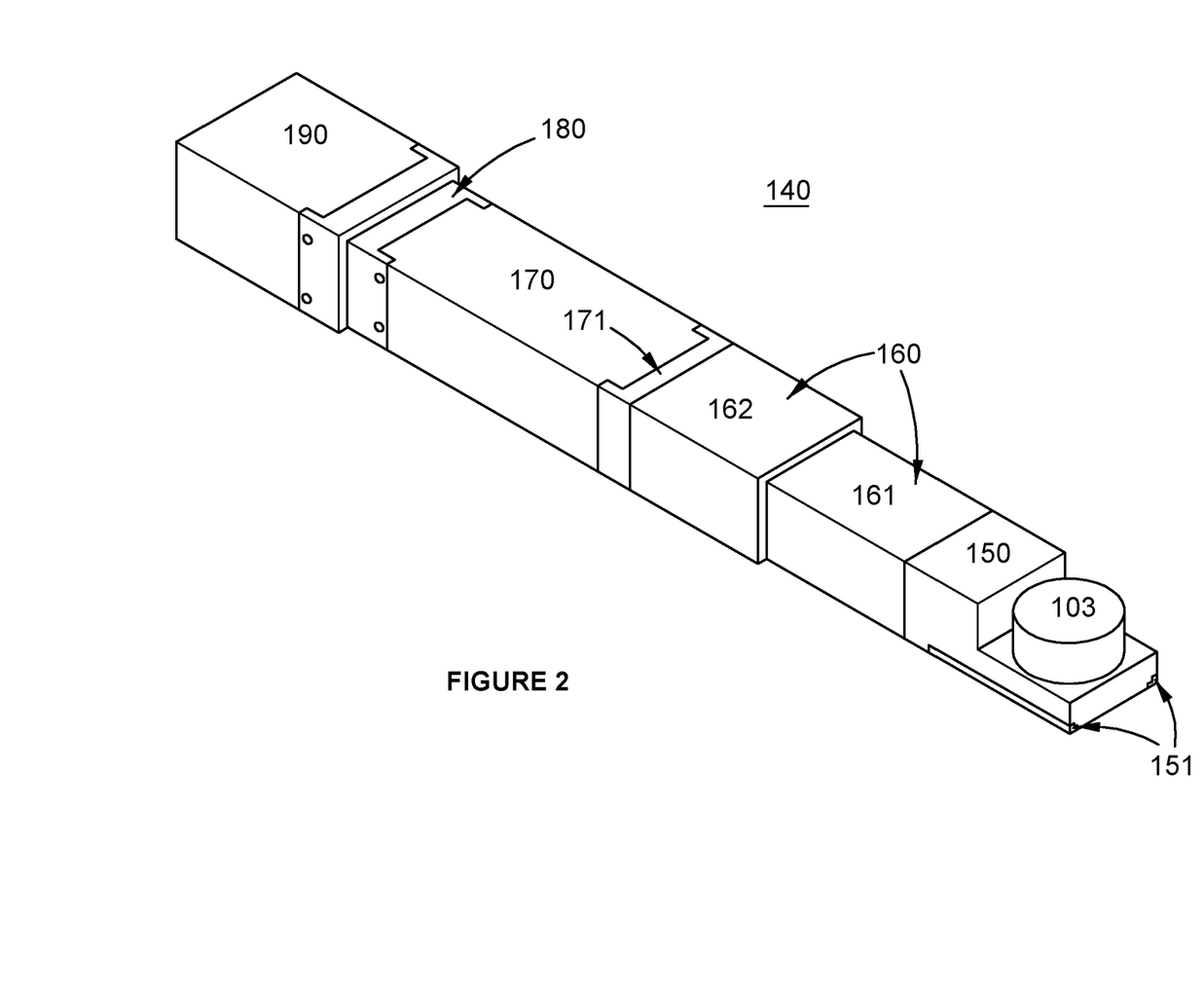
FIG. 2 is a perspective view of an embodiment of the removable sample insertion means for carrying out aspects of the invention described herein.

The design of the plug 140 is shown in more detail in FIG. 2. The sample 103 is supported on stage member 150 which is formed from steel or a similar material. In accordance with the design of the casing 104, the material from which the stage member is manufactured should also be free from elements that undergo significant activation from X-rays or neutrons.

The second section of the plug 160 comprises at least two stepped portions 161, 162, with the dimensions of the outermost step 162 larger than the innermost 161. In the example shown, the step has a width of 10 mm. The second section of the plug 160 is formed from a material providing efficient attenuation of X-rays, such as lead or tungsten. Preferably, this section of the plug 160 shall be formed from a material substantially similar to that used for the X-ray attenuation shield 110,111.

The third section of the plug 170 is constructed of a material that efficiently stops neutrons. Preferably the third section of the plug is manufactured from a material substantially similar to that used to form the neutron attenuation shield 120,121. A joining member 171 for joining the second and third sections of the plug is provided. The joining member 171 is a steel bracket bolted to the second and third sections of the plug.

The fourth section of the plug 180 is constructed of a material that provides efficient attenuation of X-rays, such as lead or tungsten. In this example the fourth section of the plug includes two steps, though in other examples it could include more than two steps, or only a single step.

The last section of the plug 190 is provided to enable the entire plug to be attached to a mechanism which provides linear motion (not shown) to transport the plug into and out of the cavity. This section 190, which is not required to provide any shielding function, may be solid or hollow structure with means to attach to a linear motion device.

The X-Ray Attenuation Shield

Tables of the X-ray shielding efficacy of different materials are readily available (for example, NCRP Report 151 "Structural Shielding Design and Evaluation for Megavoltage X- and Gamma-ray Radiotherapy facilities"). Shielding efficiency is commonly quoted as 'tenth value layers' (TVLs), being the thickness of material required to reduce the X-ray dose rate by a factor of 10. TVLs are a function of material composition, material density and X-ray source energy.

For example, reported TVL values for a 10 MeV X-ray source are 57/57 mm for lead, 410/370 mm for concrete and 110/110 mm for steel. In each case the first reported value is the TVL for the first layer of shielding, and the second reported value is the TVL for all subsequent layers of shielding. Consider a shielding design for a particular X-ray source designed to reduce dose rates by a particular factor. Let the shield be constructed from lead and have a total mass M. If the shielding material is changed to steel, then each linear dimension of the shield will need to be increased by a factor of 110/57=1.93 to achieve the same dose rate reduction factor. The mass of the new shield, M', will be given by:

$$M'=M\times 1.93^k \times \text{density of steel/density of lead}$$

where k is an exponent with a value between 1 and 3.

If the cavity 106 housing the X-ray generator is large compared to the layered shielding thickness (as is common in radiotherapy units, where the X-ray source is held in a room large enough to accommodate a patient) then k is approximately 1. If the thickness of the layered shielding is large compared to the size of the cavity 106, then k is close to 3. For relatively compact shielding designs, the value of k is between 2 and 3.

With k=2, M'=2.6 M; for k=3, M'=5.0. Therefore, the consequence of switching from lead shielding to steel shielding is to increase the required mass of the shield by a factor of 2.6-5.0. If the X-ray attenuation shield 110, 111 is constructed from concrete rather than lead, which has a still lower density, the increase in mass is a factor of 8.8-57. The inventor has determined that it is advantageous to construct the X-ray attenuation shield 110, 111 from a high-density material, and most preferably lead, if the aim is to reduce the overall mass of the shielding.

Neutron Attenuation Shielding

A significant drawback of constructing the X-ray attenuation shield from an element such as lead is the production of photoneutrons. Generally, the X-ray threshold energy for the production of neutrons via (g,n) reactions decreases with increasing atomic number, and the reaction probability or cross-section increases.

Lead consists of 4 naturally occurring isotopes: $^{204}$Pb (1.4%), $^{206}$Pb (24.1%), $^{207}$Pb (22.1%) and $^{208}$Pb (52.4%). The (g,n) thresholds for these isotopes are 8.4, 8.1, 6.7 and 7.4 MeV respectively. This means that an accelerator operated to produce X-rays with an end-point energy of about 6.7 MeV or higher will give rise to photoneutrons, with the production of neutrons increasing rapidly with increasing X-ray energy. Heavy metals such as lead are very poor at shielding neutrons.

The inventor considered adding a neutron attenuation shield outside of the X-ray shield, being formed from a material which efficiently thermalises (slows-down) and absorbs neutrons. Materials with a high hydrogen content are very efficient at slowing down neutrons, due to the high energy loss that occurs in elastic (n,p) collisions. Examples of suitable materials having a high hydrogen content include polymers with the generic formula $(-CH_2-)_n$ such as polyethylene and polypropylene, and water. The hydrogen content of these materials is approximately 0.11-0.13 g/cm$^3$. Advantageously, polymers such as polyethylene are available in large, self-supporting sheets which simplifies construction of the shielding. Other neutron shielding options include materials such as polyurethane resin, which can be cast into the required form. The resin may be mixed with materials such as polyethylene pellets to increase the hydrogen content.

Advantageously, the neutron shielding layer is designed to include a proportion of an element, such as boron (B), that strongly absorbs thermal neutrons. The isotope $^{10}$B (19.9% of natural boron) has a thermal neutron absorption cross-section of 3835 barns, compared to a value of just 0.333 barns for $^1$H and 0.00353 barns for $^{12}$C. The gamma-ray produced when boron absorbs a neutron has an energy of 478 keV compared to 2234 keV resulting from neutron capture by hydrogen. Optionally, lithium (Li) may be selected as an absorbing element. The isotope $^6$Li (7.6% of natural lithium) has a thermal neutron absorption cross-section of 940 barns. The lower cross-section and lower isotope fraction mean that lithium is a less efficient neutron absorber than boron. However, lithium produces no gamma-rays during neutron capture.

Boron or lithium can be incorporated into the neutron shield in various forms. Boron-loaded and lithium-loaded polyethylene is available with various concentrations of dopants. A loading of 5% is typical and provides efficient thermal neutron absorption. Soluble boron or lithium compounds can be added to water. Powdered boron or lithium compounds can be added to resin or resin-polymer bead mixtures.

The tenth value layer (TVL) thickness for neutrons in a material such as borated polyethylene is a function of neutron energy. Neutrons produced in (g,n) reactions have a maximum energy equal to the accelerator electron beam energy minus the reaction threshold, but most neutrons are produced at very low energy. In instances where the accelerator energy is less than 15 MeV, the mean neutron energy is <<1 MeV. The value for the neutron TVL in borated polyethylene is about 62 mm [NCRP Report No. 79, Neutron Contamination from Medical Electron Accelerators]. A neutron shield of thickness 200-300 mm will then reduce the neutron flux by a factor of 1700-7000.

Gamma Attenuation Shielding

Designing appropriate radiation shielding is further complicated since the capture of neutrons in the neutron shielding layer can produce energetic gamma-rays. The low-density hydrogenous materials used for the neutron shielding layer provide very limited shielding of these gamma-rays, which can be most efficiently blocked using a tertiary shield (gamma attenuation shield) comprised of lead, steel or other high density metal.

If boron is used as the neutron absorbing material in the neutron attenuation shield, then the gamma-ray flux outside of the shield is dominated by 478 keV gamma-rays resulting from neutron capture by $^{10}$B. The TVL for 478 keV gamma-rays in lead is approximately 1.2 cm, and in iron, 5.2 cm. To provide 100-fold attenuation of the neutron-induced gamma-ray dose-rate would require a thickness of approximately 2.5 cm of lead or 10 cm of iron. The mass of iron shielding required to produce this level of attenuation would be about 3 times greater than the mass of lead shielding. Consequently, lead is the preferred choice for the gamma attenuation shield.

Member for Inserting and Removing Samples

A mechanism for rapidly inserting and removing samples from the vicinity of the X-ray source is desired. This is particularly true for short-lived activation reactions such as formation of the $^{197}$Au meta-state which has a half-life of 7.73 s.

The layered shield includes a sleeve, or a sample access channel, which is substantially straight. The plug 140 completely fills the sample access channel when it is inserted and provides the means for inserting and removing samples as described previously. As illustrated in FIG. 2, the outer profile of the plug 140 is stepped to remove any straight-line paths through which either X-ray or neutron radiation can escape. Advantageously, this allows for larger tolerances to be left between the sides of the plug 140 and the walls of the channel through which the plug passes, simplifying both manufacture and movement of the plug.

Determination of Thicknesses of the X-Ray, Neutron and Gamma Attenuation Shields The X-ray attenuation shield thickness in the forward direction is estimated using tabulated TVLs and the desired dose attenuation factor. Consider an accelerator that produces an unshielded dose rate at 1 m from the target in the forward direction of R Sv/min. Suppose that the desired, shielded dose rate at the closest personnel-accessible point at distance d from the target is r microSv/hour. For a lead X-ray attenuation shield where the TVL for Bremsstrahlung radiation is independent of the accelerator energy over at least the energy range 4-25 MeV, the shielding thickness t is given by:

$$t = TVL \times \log_{10}[(R \times 60 \times 10^6)/(rd^2)] \tag{1}$$

For example, consider a LINAC producing a maximum unshielded dose rate of 160 Sv/min. If the closest accessible point is 1 m from the target and the desired shielded dose rate is 2.5 microSv/hour, then t=9.8 TVL. Substituting the tabulated value of 57 mm for TVL yields t=560 mm.

The determination of the optimum X-ray attenuation shield thickness at different angles is a more complex calculation, as it depends not just on the angular profile of X-ray emission from the source, but also on the processes of X-ray scattering and absorption inside the shielding. The inventor has determined empirically that for accelerator sources producing X-rays with end-point energies in the range 8-14 MeV, X-ray attenuation shielding thicknesses within the range of 60-80% (and more preferably 75%) and within the range of 25-50% (and more preferably 50%) of the thickness in the forward direction are suitable at angles of 90° and 180° to the electron beam respectively. For the example under consideration, an X-ray attenuation shield thickness of 420 mm is required at an angle of 90°, and a thickness of about 280 mm is required at an angle of 180°.

Within these overall requirements on shield thickness, the detailed configuration of the shielding can be most conveniently optimised using a radiation transport computer code, such as a Monte Carlo simulation. The simulation code can be used to model the production, scattering and absorption of X-rays, and to record the simulated dose rate at different positions throughout the model. The shielding configuration can then be optimised to achieve the desired dose rate at all points on the outer surface of the shield. General-purpose Monte Carlo simulation codes such as EGS, MCNP and GEANT are readily available.

Determination of the thickness of the neutron attenuation shield depends on the rate of production of neutrons, which is a strong function of the accelerator end-point energy. Neutron production can occur in the accelerator target, in the irradiated sample, and in the X-ray attenuation shield. Neutron production data are supplied by manufacturers of many accelerator systems. They can also be measured experimentally, or calculated using computer simulation codes.

Figure 3:
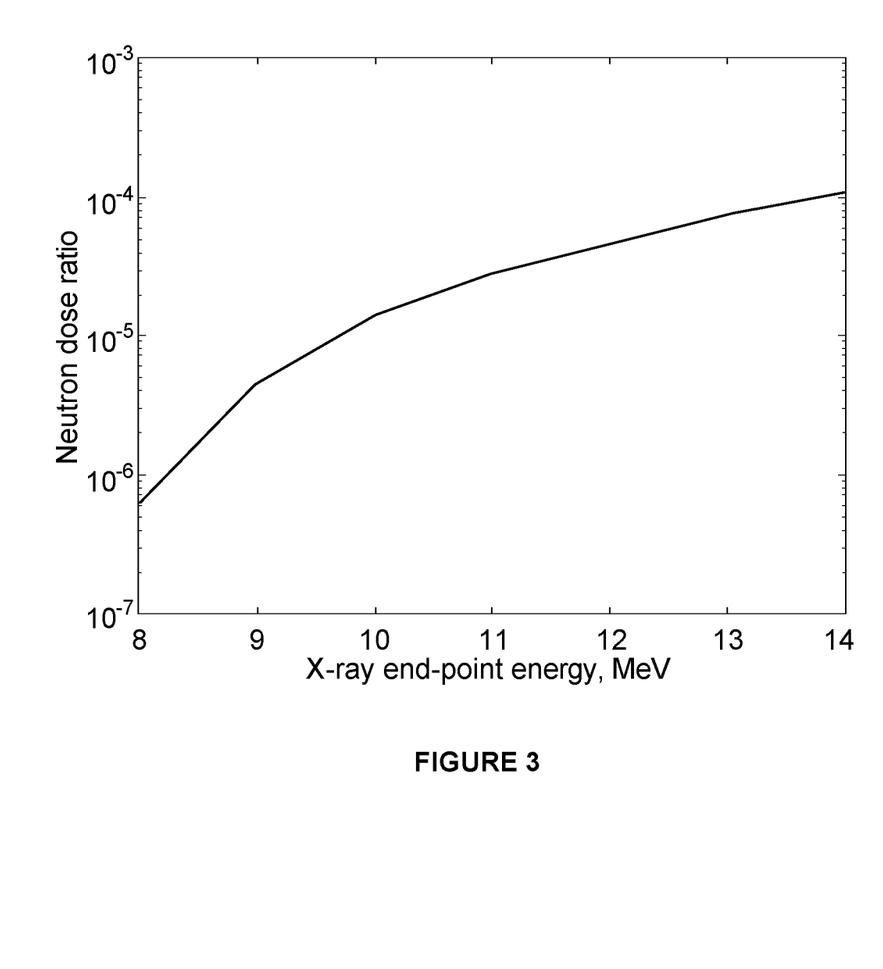
FIG. 3 shows a graph illustrating the ratio of neutron dose rate to unshielded forward X-ray dose rate versus end-point energy for an electron accelerator fitted with a tungsten Bremsstrahlung converter target.

FIG. 3 plots the neutron dose rate per unit forward-directed X-ray dose for an accelerator with a tungsten target and lead X-ray attenuation shielding. The electron accelerator operating energy, and hence the X-ray end-point energy is varied between 8 and 14 MeV. The results were determined by the inventor using a computer simulation of X-ray transport and neutron production, performed using the MCNP Monte Carlo code.

Returning to the example of a LINAC producing an unshielded forward X-ray dose rate of 160 Sv/min, if the LINAC operating energy is 8.5 MeV, then the corresponding neutron dose rate will be approximately 160×2×10$^{-6}$ Sv/min=3.2×10$^4$ Sv/min. If it is desired to reduce this dose rate to 2.5 microSv/hr at a distance of 1 m, then equation 1 can be used to determine that t=3.9 TVL. With a TVL of 62 mm for low energy neutrons, the corresponding shielding thickness is 240 mm. As neutron production is a function of LINAC energy, the designed thickness should be calculated for the envelope of operating energies/dose-rate outputs for the application in question, and the largest thickness selected.

As neutron production is approximately isotropic, a similar shielding thickness is required in all directions. If the design of the electron accelerator requires a substantial cavity to house the accelerating structure, such that the portion of the shield in a backwards direction is significantly further from the target than the portion in a forward direction, then equation 1 predicts that a reduced shielding thickness may be acceptable in the backward direction, due to the larger value of d$^2$.

A coupled photon-neutron Monte Carlo simulation can be used to optimise the detailed design of the neutron attenuation shield. A model of the X-ray attenuation shield and neutron attenuation shield is created, and X-rays and X-ray induced neutrons tracked through the model. The neutron dose rate is then recorded at points on the surface of the neutron attenuation shield. The thickness of the neutron attenuation shield can be adjusted to ensure that this outer surface approximately coincidences with a neutron isodose contour at the desired dose-rate level.

As the production of neutron-induced gamma-rays is proportional to the neutron flux, and the respective thicknesses of the neutron attenuation shield and the gamma attenuation shield required to reduce the neutron and gamma-ray fluxes to acceptable levels are both proportional to the logarithm of the flux reduction factor, the required thickness of the gamma attenuation shield is proportional to the optimised thickness of the neutron attenuation shield.

In the case that the neutron attenuation shield is made from polyethylene containing 5% boron by weight, and the gamma attenuation shield is made from lead, the inventor has determined that the optimal thickness of the gamma attenuation shield is 0.1 times the thickness of the secondary polyethylene layer. For example, if the thickness of the neutron attenuation shield in a particular location is 300 mm, then the optimal thickness of the gamma attenuation shield at this position is 30 mm. If the composition of the neutron or gamma attenuation shields are changed, a different constant of proportionality can be determined, for example through the use of Monte Carlo simulation.

The embodiment herein described has the advantage in that it can provide GAA services in a compact, relocatable format. The embodiment herein described allows an 8 kW, 8-14 MeV LINAC-based X-ray source to be deployed in the footprint of a standard 20' shipping container. With the addition of additional container(s) housing sample handling and radiation detection systems, an entire GAA facility can be constructed in a factory and then rapidly transported and set up in any desired location. This is particularly advantageous when it is desired to set up a minerals analysis lab at a remote location such as a mining site.

Embodiments of the invention provide radiation shielding designed for use around a high-energy X-ray source in such a way as to reduce the size and weight of the shielding compared to existing designs. Advantageously, reducing the size and weight to be consistent with the allowed parameters for a standard 20' shipping container permits easier installation of high-energy X-ray equipment.

Whilst embodiments of the invention have been described as being particularly applicable to fields requiring the analysis of elements in mineral samples, the invention is additionally applicable to applications including radiography, cargo screening, fissionable material detection and sterilisation. In essence, the invention is application to any application requiring the deployment of X-ray sources operable at sufficiently high-energy to produce neutrons.

Whilst not illustrated, it should be appreciated that to enable maintenance of the accelerator, the apparatus will in most circumstances be configured to enable access to the accelerator. The apparatus may therefore be configured with doors in the vicinity of the accelerator. In one instance the apparatus may be configured with doors situated at the rear end of the accelerator immediately behind the accelerator permit this access.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A shielded X-ray radiation apparatus for analysis of materials via gamma activation analysis, the apparatus comprising:
   an X-ray conversion target, wherein, when an electron accelerator directs an electron beam having an electron beam direction at the X-ray conversion target, the X-ray conversion target generates X-rays;
   an X-ray attenuation shield including an elongate cavity to house the X-ray conversion target and incorporating a region to accommodate a sample;
   a neutron attenuation shield;
   a gamma attenuation shield; and
   a support casing housed within the X-ray attenuation shield and configured to support the X-ray conversion target and the sample,
      wherein the neutron attenuation shield is adjacent to and substantially surrounds the X-ray attenuation shield; and
      wherein the gamma attenuation shield is adjacent to and substantially surrounds the neutron attenuation shield.

2. The shielded X-ray radiation apparatus according to claim 1, wherein the X-ray conversion target is configured to generate the X-rays when the electron beam has an energy between 7 MeV and 15 MeV.

3. The shielded X-ray radiation apparatus according to claim 1, wherein the thickness of the X-ray attenuation shield at an angle of 90° from the electron beam direction measured relative to the location of the conversion target is within the range of 60-80% of the thickness in the forward direction, and the thickness at an angle of 180° from the electron beam direction measured relative to the location of the conversion target is within the range of 25-50% of the thickness in the forward direction.

4. The shielded X-ray radiation apparatus according to claim 3, wherein the thickness of the X-ray attenuation shield at an angle of 90° from the electron beam direction measured relative to the location of the conversion target is approximately 75% of the thickness in the forward direction, and the thickness at an angle of 180° from the electron beam direction measured relative to the location of the conversion target is approximately 50% of the thickness in the forward direction.

5. The shielded X-ray radiation apparatus according to claim 1, wherein a first thickness ($t_{XR}$) of the X-ray attenuation shield thickness in the forward direction is estimated by the equation: $t_{XR}=TVL \times \log 10[(R \times 60 \times 106)/(r\ d2)]$, where d is the distance from the X-ray conversion target, R is the X-ray dose rate at 1 m from the X-ray conversion target produced by the X-ray conversion target, r is the shielded X-ray dose rate at the closest personnel-accessible point, and TVL is a predefined tenth value layer thickness for the X-ray attenuation shield material.

6. The shielded X-ray radiation apparatus according to claim 1, wherein the neutron attenuation shield has a thickness ($t_{nt}$) in the forward direction which is estimated by the equation: $t_{nt}=TVL_n \log 10\ (f)$ where $TVL_n$ is a predefined tenth-value layer thickness for the attenuation of low energy neutrons in the neutron attenuation shield and f is a ratio of an unshielded neutron dose rate to a desired shielded neutron dose rate.

7. The shielded X-ray radiation apparatus according to claim 1, wherein the thickness of the neutron attenuation shield at an angle of 180° from the electron beam direction measured relative to the location of the conversion target in a rearward direction is 50% to 100% of the thickness (tnt) in the forward direction.

8. The shielded X-ray radiation apparatus according to claim 1, wherein the gamma attenuation shield has a thickness which is proportional to the thickness of the neutron attenuation shield.

9. The shielded X-ray radiation apparatus according to claim 1, wherein the X-ray attenuation shield is constructed from lead, tungsten, or layers of lead and tungsten.

10. The shielded X-ray radiation apparatus according to claim 1, wherein the neutron attenuation shield is constructed from a polymer material having a hydrogen density of approximately 0.1 g/cm3.

11. The shielded X-ray radiation apparatus according to claim 10, wherein the polymer material comprises boron or lithium.

12. The shielded X-ray radiation apparatus according to claim 1, wherein the gamma attenuation shield is constructed from lead, steel, or a composite of lead and steel.

13. The shielded X-ray radiation apparatus according to claim 1, wherein:
the X-ray attenuation shield has a thickness in the electron beam direction calculated using a tabulated tenth value layer thickness for X-rays, the X-ray dose-rate output of the X-ray conversion target, and a desired X-ray dose rate outside of the shield, wherein the thickness of the X-ray attenuation shield decreases with increasing angle from the electron beam direction measured relative to the location of the conversion target; and
the neutron attenuation shield has a thickness in the electron beam direction calculated using a tabulated tenth value layer thickness for neutrons, the neutron dose-rate output of the X-ray conversion target, and a desired neutron dose rate outside of the shield, wherein the thickness of the neutron attenuation shield decreases with increasing distance from the X-ray conversion target.

14. The shielded X-ray radiation apparatus according to claim 1, further comprising the electron accelerator, wherein the electron accelerator is housed within the X-ray attenuation shield, the neutron attenuation shield, and the gamma attenuation shield.

15. The shielded X-ray radiation apparatus according to claim 14, wherein each of the X-ray attenuation shield, the neutron attenuation shield, and the gamma attenuation shield comprises:
a relatively wide head portion housing the X-ray conversion target and the sample; and
a relatively narrow tail portion housing at least part of the electron accelerator.

16. The shielded X-ray radiation apparatus according to claim 1, further comprising the electron accelerator, wherein at least a forward portion of the electron accelerator is housed within the support casing, the X-ray attenuation shield, the neutron attenuation shield, and the gamma attenuation shield.

17. The shielded X-ray radiation apparatus according to claim 1, wherein the support casing supports the sample and the X-ray conversion target in correct relative positions.

18. A shielded X-ray radiation apparatus for analysis of materials via gamma activation analysis, the apparatus comprising:
an X-ray conversion target, wherein, when an electron accelerator directs an electron beam having an electron beam direction at the X-ray conversion target, the X-ray conversion target generates X-rays;
an X-ray attenuation shield including an elongate cavity to house the X-ray conversion target and incorporating a region to accommodate a sample;
a neutron attenuation shield;
a gamma attenuation shield; and
a removable plug configured to insert the sample into the elongate cavity;
wherein the removable plug comprises adjacent blocks of material, each block having a thickness and a composition which substantially matches thickness and composition of a corresponding one of the X-ray attenuation, neutron attenuation, and gamma-ray attenuation shields;
wherein the neutron attenuation shield is adjacent to and substantially surrounds the X-ray attenuation shield; and
wherein the gamma attenuation shield is adjacent to and substantially surrounds the neutron attenuation shield.

19. The shielded X-ray radiation apparatus according to claim 18, wherein the removable plug further comprises a stage member on which the sample to be irradiated is locatable; and wherein the adjacent blocks of materials comprise a first block adjacent the stage member, a second block abutting the first block, and a third block abutting the second block; wherein:
the first block comprises a material to substantially attenuate X-rays and having a thickness which is the same or substantially the same as the X-ray attenuation shield,
the second block comprises a material to substantially attenuate neutrons and having a thickness which is the same or substantially the same as the neutron attenuation shield, and
the third block comprises a material to substantially attenuate gamma-rays with a thickness which is the same or substantially the same as the gamma attenuation shield; and
wherein the shielded X-ray radiation apparatus comprises a sleeve through which the stage member is able to traverse.

20. The shielded X-ray radiation apparatus according to claim 19, wherein the sleeve of the apparatus and the removable plug have a clearance tolerance of less than 2.00 mm.

21. The shielded X-ray radiation apparatus according to claim 19, wherein the stage member of the removable plug is constructed from a substance that is free from elements that undergo significant activation from X-rays or neutrons.

22. The shielded X-ray radiation apparatus according to claim 19, wherein an outer profile of the removable plug is stepped, with at least one of the adjacent blocks increasing in width, in a direction perpendicular to a direction of travel of the removable plug with increasing distance from the stage member.

23. The shielded X-ray radiation apparatus according to claim 22, wherein the width of the or each step is in the range of 5 to 15 mm.

24. The shielded X-ray radiation apparatus according to claim 22, wherein the first block comprises at least two steps, such that the width of the first blocks increase in a stepwise fashion from the innermost to outermost steps.

* * * * *